US010690805B2

(12) United States Patent
Piscsalko et al.

(10) Patent No.: US 10,690,805 B2
(45) Date of Patent: *Jun. 23, 2020

(54) BOREHOLD TESTING DEVICE

(71) Applicant: Pile Dynamics, Inc., Solon, OH (US)

(72) Inventors: George R. Piscsalko, Aurora, OH (US);
Dean A. Cotton, Fairview, OH (US);
Richard E. Berris, Jr., Chagrin Falls,
OH (US); Tyler A. Piedimonte,
Cleveland, OH (US)

(73) Assignee: Pile Dynamics, Inc., Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,962

(22) Filed: May 9, 2019

(65) Prior Publication Data

US 2019/0271796 A1    Sep. 5, 2019

Related U.S. Application Data

(63) Continuation of application No. 15/233,317, filed on Aug. 10, 2016, now Pat. No. 10,330,823, which is a
(Continued)

(51) Int. Cl.
*G01V 11/00* (2006.01)
*E21B 47/08* (2012.01)
(Continued)

(52) U.S. Cl.
CPC .............. *G01V 11/002* (2013.01); *E02D 1/02* (2013.01); *E21B 47/00* (2013.01);
(Continued)

(58) Field of Classification Search
CPC ......... G01V 11/002; E02D 1/02; E21B 47/00; E21B 47/002; E21B 47/082
See application file for complete search history.

(56) References Cited

U.S. PATENT DOCUMENTS 3,474,879 A * 10/1969 Adair .................... E21B 47/082
181/104
3,775,739 A 11/1973 Vogel
(Continued)

FOREIGN PATENT DOCUMENTS

| CN | 1530646 A | 9/2004 |
| JP | 02157391 A | 6/1990 |

(Continued)

OTHER PUBLICATIONS

European Search Report for corresponding EP 16 83 7527 dated Oct. 24, 2018, 7 pgs.
(Continued)

*Primary Examiner* — John Fitzgerald
(74) *Attorney, Agent, or Firm* — Rankin, Hill & Clark LLP

(57) ABSTRACT

An inspection system to measure the condition of at least a wall of a ground opening, the inspection system having a head unit for lowering into a borehole during a data collection phase wherein at least one set of test data is collected concerning one or more physical characteristics of the borehole during the data collection phase, the head unit having an internal measurement system and a sensor arrangement with a plurality of sensors facing radially outwardly of a head axis that is generally parallel to at least a portion of a borehole axis, the plurality of sensors allowing the head unit to be moved during the data collection phase without rotation about the head axis, the plurality of sensors at least partially producing the at least one set of test data collected during the data collection phase.

7 Claims, 5 Drawing Sheets

Related U.S. Application Data continuation-in-part of application No. 14/560,879, filed on Dec. 4, 2014, now abandoned.

(60) Provisional application No. 62/205,335, filed on Aug. 14, 2015, provisional application No. 61/912,206, filed on Dec. 5, 2013.

(51) Int. Cl.
*E21B 47/00* (2012.01)
*G01V 9/00* (2006.01)
*E02D 1/02* (2006.01)

(52) U.S. Cl.
CPC ........ *E21B 47/0002* (2013.01); *E21B 47/082* (2013.01); *G01V 9/00* (2013.01)

(56) References Cited

U.S. PATENT DOCUMENTS

| | | | |
|---|---|---|---|
| 3,820,384 A | 6/1974 | Brill | |
| 4,079,625 A | 3/1978 | Mann | |
| 4,091,661 A | 5/1978 | Handy et al. | |
| 4,283,953 A * | 8/1981 | Plona | G01N 29/11 367/86 |
| 4,332,160 A | 6/1982 | Baragar et al. | |
| 4,380,808 A * | 4/1983 | Hill | B06B 1/0633 310/337 |
| 4,400,970 A * | 8/1983 | Ali | E02D 1/022 73/84 |
| 4,539,851 A | 9/1985 | Lutenegger | |
| 4,542,655 A | 9/1985 | Park et al. | |
| 4,545,242 A * | 10/1985 | Chan | G01B 7/26 340/854.9 |
| 4,601,024 A * | 7/1986 | Broding | E21B 47/0002 367/86 |
| 4,641,520 A * | 2/1987 | Mao | G01V 1/44 367/25 |
| 4,646,565 A * | 3/1987 | Siegfried | G01V 1/46 181/105 |
| 4,701,892 A * | 10/1987 | Anderson | E21B 47/082 181/103 |
| 4,733,380 A * | 3/1988 | Havira | E21B 47/0002 181/105 |
| 4,806,153 A * | 2/1989 | Sakai | E02D 1/022 175/50 |
| 4,867,264 A * | 9/1989 | Siegfried | E21B 47/0002 181/105 |
| 4,947,683 A * | 8/1990 | Minear | E21B 47/101 73/152.32 |
| 4,979,151 A * | 12/1990 | Ekstrom | E21B 47/082 181/105 |
| 5,099,696 A * | 3/1992 | Yabuuchi | E02D 1/02 405/232 |
| 5,127,261 A * | 7/1992 | Ingram | E21B 25/04 73/152.19 |
| 5,164,548 A * | 11/1992 | Angehrn | E21B 47/0002 181/103 |
| 5,198,770 A | 3/1993 | Decorps et al. | |
| 5,608,169 A * | 3/1997 | Fujioka | G01N 3/10 73/786 |
| 5,978,749 A | 11/1999 | Likins, Jr. et al. | |
| 5,987,385 A | 11/1999 | Varsamis et al. | |
| 6,041,860 A * | 3/2000 | Nazzal | E21B 23/002 166/250.01 |
| 6,058,874 A | 5/2000 | Glenning et al. | |
| 6,176,323 B1 | 1/2001 | Weirich et al. | |
| 6,241,028 B1 | 6/2001 | Bijleveld et al. | |
| 6,301,551 B1 | 10/2001 | Piscalko et al. | |
| 6,308,787 B1 | 10/2001 | Alft | |
| 6,480,118 B1 * | 11/2002 | Rao | E21B 47/00 181/102 |
| 6,491,115 B2 | 12/2002 | Van Houwelingen et al. | |
| 6,533,502 B2 * | 3/2003 | McVay | E02D 13/06 340/853.8 |
| 6,604,432 B1 * | 8/2003 | Hamblen | E02D 1/02 73/594 |
| 6,655,220 B1 | 12/2003 | Reiffsteck | |
| 6,783,273 B1 | 8/2004 | Mullins et al. | |
| 6,791,469 B1 * | 9/2004 | Rao | E21B 47/00 175/26 |
| 6,912,903 B2 * | 7/2005 | Hamblen | E02D 1/02 73/573 |
| 6,931,952 B2 * | 8/2005 | Rantala | G01L 5/008 73/431 |
| 7,187,620 B2 | 3/2007 | Nutt et al. | |
| 7,187,784 B2 * | 3/2007 | Tawfiq | E21B 47/0002 166/250.01 |
| 7,495,995 B2 * | 2/2009 | Hayes | E02D 1/02 367/35 |
| 7,872,947 B2 | 1/2011 | An et al. | |
| 7,921,730 B2 | 4/2011 | Tan | |
| 8,065,813 B2 | 11/2011 | Siepi | |
| 8,100,196 B2 | 1/2012 | Pastusek et al. | |
| 8,151,658 B1 * | 4/2012 | Ding | E21B 47/00 73/865.8 |
| 8,169,477 B2 * | 5/2012 | Tawfiq | E21B 47/0002 348/82 |
| 8,382,369 B2 | 2/2013 | Piscsalko et al. | |
| 9,217,324 B2 * | 12/2015 | Hayes | E02D 1/02 |
| 9,249,559 B2 | 2/2016 | Dyer et al. | |
| 9,291,048 B2 | 3/2016 | MacPhail et al. | |
| 9,720,121 B2 * | 8/2017 | Zhou | E21B 47/0002 |
| 10,132,954 B2 | 11/2018 | Donderici | |
| 10,330,823 B2 * | 6/2019 | Piscsalko | E02D 1/02 |
| 2003/0121338 A1 | 7/2003 | Yates | |
| 2005/0011645 A1 | 1/2005 | Aronstam et al. | |
| 2005/0241825 A1 | 11/2005 | Burris et al. | |
| 2006/0173627 A1 * | 8/2006 | Haugland | G01V 11/00 702/9 |
| 2006/0194537 A1 | 8/2006 | Mccoy | |
| 2007/0052551 A1 | 3/2007 | Lovell et al. | |
| 2007/0127780 A1 * | 6/2007 | Tawfiq | E21B 47/0002 382/109 |
| 2007/0152054 A1 * | 7/2007 | Bonavides | E21B 47/0002 235/454 |
| 2007/0223822 A1 | 9/2007 | Haugland | |
| 2009/0146835 A1 | 6/2009 | Xu et al. | |
| 2010/0095757 A1 * | 4/2010 | Hansen | G01N 29/043 73/152.16 |
| 2012/0203462 A1 | 8/2012 | Dalton et al. | |
| 2013/0000399 A1 * | 1/2013 | Lilly | E21B 47/011 73/152.58 |
| 2013/0128697 A1 * | 5/2013 | Contant | E21B 17/028 367/81 |
| 2013/0168081 A1 * | 7/2013 | Yang | E21B 47/12 166/247 |
| 2013/0168085 A1 * | 7/2013 | Fraser | E21B 21/103 166/250.01 |
| 2013/0192359 A1 | 8/2013 | Pelletier et al. | |
| 2013/0306374 A1 * | 11/2013 | Wood | E21B 47/12 175/40 |
| 2014/0012506 A1 | 1/2014 | Adsit | |
| 2014/0022088 A1 | 1/2014 | Chau et al. | |
| 2014/0027113 A1 | 1/2014 | Veeningen | |
| 2014/0043938 A1 | 2/2014 | Sinha | |
| 2014/0182845 A1 * | 7/2014 | Roberson | E21B 33/13 166/250.07 |
| 2014/0312906 A1 | 10/2014 | Gold | |
| 2015/0109886 A1 * | 4/2015 | Mekic | G01V 1/44 367/25 |
| 2015/0204993 A1 * | 7/2015 | Leggett, III | E21B 47/01 367/7 |
| 2015/0211353 A1 * | 7/2015 | Ding | E21B 47/00 73/152.54 |
| 2015/0233230 A1 * | 8/2015 | Likins, Jr. | E02D 1/02 166/254.1 |
| 2015/0268367 A1 * | 9/2015 | Khajeh | G01V 1/46 367/35 |

(56) References Cited

U.S. PATENT DOCUMENTS

2015/0281848 A1* 10/2015 Khajeh ................. B06B 1/0622
  381/190
2016/0348500 A1* 12/2016 Piscsalko ................. G01V 9/00
2017/0108611 A1* 4/2017 Vasquez ................. E21B 37/00

FOREIGN PATENT DOCUMENTS

| KR | 200292852 Y1 | 10/2002 |
| KR | 100860591 B1 | 9/2008 |
| KR | 20170008994 A | 1/2017 |

OTHER PUBLICATIONS

Chinese Search Report for corresponding CN 201680047584.5 dated Dec. 7, 2018, 6 pgs.
Korean Notice of Allowance for corresponding KR 10-2018-7004496 dated Feb. 22, 2019, 5 pgs.
Korean Intellectual Property Rights Information Service data: KR 20-0292852, Published Oct. 9, 2002, 2 pg.
International Search Report, Cited in corresponding PCT/US2016/46344, dated Oct. 31, 2016, 2 pages.

\* cited by examiner

BOREHOLD TESTING DEVICE

This application is a continuation of patent application Ser. No. 15/233,317 that was filed on Aug. 10, 2016, which claims priority in Provisional Patent Application Ser. No. 62/205,335, filed on Aug. 14, 2015. In addition, patent application Ser. No. 15/233,317 is a Continuation-in-Part application of U.S. patent application Ser. No. 14/560,879 that was filed on Dec. 4, 2014, which claims the benefit of Provisional Application Ser. No. 61/912,206 that was filed on Dec. 5, 2013. All of these prior filings are incorporated by reference herein.

The invention of this application relates to a measuring device that can be deployed in a borehole or any deep excavation or opening to inspect the borehole and/or excavation, in particular, to inspect the bottom and/or side walls of the excavation and provide fast and reliable information about the quality, shape and/or verticality of the borehole and/or excavation.

INCORPORATION BY REFERENCE

McVay et al.—U.S. Pat. No. 6,533,502 discloses a wireless apparatus and method for analysis of piles which is incorporated by reference herein for showing the same. In addition, Mullins et al.—U.S. Pat. No. 6,783,273 discloses a method for testing integrity of concrete shafts which is also incorporated by reference in this application for showing the same. Piscsalko et al.—U.S. Pat. No. 6,301,551 discloses a remote pile driving analyzer and is incorporated by reference in this application for showing the same. Likins Jr. et al.—U.S. Pat. No. 5,978,749 discloses a pile installation recording system and is incorporated by reference in this application for showing the same. Piscsalko et al.—U.S. Pat. No. 8,382,369 discloses a pile sensing device and method of using the same and is incorporated by reference in this application for showing the same. Dalton et al.—Publ. No. 2012/0203462 discloses a pile installation and monitoring system and method of using the same and is incorporated by reference in this application for showing the same.

Ding—U.S. Pat. No. 8,151,658 discloses an inspection device for the inspection of an interior bottom of a borehole which is incorporated by reference herein for showing the same. Tawfiq et al. U.S. Pat. No. 7,187,784 discloses a borescope for drilled shaft inspection and is incorporated by reference herein for showing the same. In addition, Tawfiq et al. U.S. Pat. No. 8,169,477 discloses a digital video borescope for drilled shaft inspection and is incorporated by reference herein for showing the same. Hayes 7,495,995 discloses a method and apparatus for investigating a borehole with a caliper and is incorporated by reference herein for showing the same.

Glenning et al.—U.S. Pat. No. 6,058,874 discloses radio frequency communications for underwater devices and is incorporated by reference in this application for showing the same. An et al.—U.S. Pat. No. 7,872,947 discloses a system and method for underwater wireless communication for underwater devices and is also incorporated by reference in this application for showing the same. Mccoy—U.S. Publication No. 20060194537 discloses radio frequency communications for underwater devices and is incorporated by reference in this application for showing the same.

BACKGROUND OF THE INVENTION

Applicant has found that the invention of this application works particularly well with the drilling and inspection of drilled pile shafts or boreholes wherein the reference "borehole" is being used throughout this application. However, this application is not to be limited to drilled pile shafts or boreholes wherein reference to piles and/or boreholes in this application is not to limit the scope of this application. In this respect, the invention of this application can be used in connection with any deep excavation wherein the quality, shape, radius and/or verticality need to be determined and/or measured. Yet further, the invention of this application can also be used for measuring other openings such as slurry walls or any other extended openings. Similarly, "piles" can equally refer to drilled shafts or other deep foundation elements. Thus, boreholes can equally refer to any opening in a layer, such as a ground layer and any other excavation, such as a slurry wall. Application to shallow foundations and/or openings is also useful.

Sensing apparatuses have been used in the building and construction industry for a number of years. These sensing apparatuses include a wide range of devices used for a wide range of reasons in the field. These devices include sensing devices that are used in connection with the installation and use of supporting elements such as piles that are used to support the weight of superstructures such as, but not limited to, supporting the weight of buildings and bridges. As can be appreciated, it is important to both ensure that a supporting foundation element, such as a pile, has been properly formed and installed and that structurally it is in proper condition throughout its use in the field. It must also have sufficient geotechnical bearing capacity to support the applied load without excessive settlement.

With respect to the installation of piles, it is important that these structures be properly constructed so that the pile can support the weight of a building or superstructure. Thus, over the years, systems have been designed to work in connection with the installation of a pile to ensure that the pile meets the building requirements for the structure. These include sensing devices that work in connection with the driving of a pile as is shown in Piscsalko et al., U.S. Pat. No. 6,301,551. Again, the Piscsalko patent is incorporated by reference herein as background material relating to the sensing and driving of structural piles. These devices help the workers driving these piles to determine that the pile has been properly driven within the soil without over stressing the pile during the driving process, and assure the supervising engineer that the pile meets all design requirements including adequate geotechnical bearing capacity.

Similarly, devices are known which are used to monitor the pile after it is driven. This includes the Piscsalko patents which include devices that can be used to monitor the pile even after the driving process. Further, Mcvay, et al., U.S. Pat. No. 6,533,502 also discloses a device used to monitor a pile during or after the driving process is completed. The information produced by the systems can be used to determine the current state of the pile, including the geotechnical bearing capacity, and for determining a defect and/or damage, such as structural damage, that may or may not have incurred in response to any one of a number of events including natural disasters.

In addition, it is known in the art that devices can be used to help determine the structural integrity of a poured pile wherein the pouring of the pile and the quality of this pouring can determine the structural integrity of the pile once a poured material, like concrete, has cured. Mullins, et al., U.S. Pat. No. 6,783,273 attempts to measure this integrity of a poured pile by disclosing a system and method for testing the integrity of concrete shafts by moving a single thermal sensor arrangement up and down in a logging tube during the curing cycle of the concrete in the poured pile. Piscsalko U.S. Pat. No. 8,382,369 discloses an alternative to the Mullins device and discloses a thermal pile sensing device that includes one or more sensor strings, each with multiple thermal sensors, that are capable of monitoring the entire pile generally simultaneously and over a period of time and can create two or three dimensional images, in real time, based on the curing of the poured material to assess structural integrity and/or other structural characteristics.

However, while the prior art disclosed above can effectively measure the integrity of the pile and certain aspects of the borehole during or after the pouring of the pile, the bearing capacity of the pile is also and more usually dependent on the condition of the soil around the length of the shaft and below the bottom borehole before the pile is poured. The bearing capacity at the bottom of the borehole relates to the condition of the soil at the bottom of the borehole wherein loose soil has less bearing capacity than soils that are undisturbed or dense. Loose soil also contributes to undesirable increased settlement of the supported structure. Thus, it is best to reduce the amount of loose soil at the bottom of the borehole. In view of the difficulties associated with viewing the bottom of a borehole that can be many meters below the ground surface, and frequently in an opaque slurry condition consisting of suspended clay particles mixed in water, or possibly a liquid polymer mixture, it is common practice to employ a so-called "clean-out bucket" to reduce the amount of unsuitable bearing material, such as loose soil, at the shaft bottom. This procedure requires replacing the drilling equipment with the clean-out bucket, which is then lowered into the borehole. The success of the bottom cleaning is, however, not assured and several passes or cycles of this effort may be needed. The uncertainty can lead to unnecessary effort and, therefore, cost. Throughout the remaining specification of this application, the terminology "debris layer" and/or "debris" will be used to generally define the unsuitable bearing material above the bearing layer. The unsuitable bearing material includes, but is not limited to, loose soil, loose material, soft material and/or general debris. The debris together forms the debris layer. The same is true with the condition of the borehole wall wherein the condition and shape of the borehole wall is also a factor in the bearing capacity of the poured pile.

Therefore, there is still a need for a system to inspect the surfaces of a borehole before a pile is poured that reduces the complexity and cost of the system without adversely increasing labor costs by requiring highly skilled operators at the jobsite for long periods of time and working near the borehole. Yet further, there is a need for a system that makes it less costly to inspect the borehole bottom and/or sides and reduces the need for, or time required by, the secondary excavating system to clean up the debris on the bottom of the borehole.

SUMMARY OF THE INVENTION

The invention of this application relates to a borehole and/or deep excavation inspection device; and more particularly, to a borehole and/or deep excavation inspection device and system.

Even more particularly, the invention of this application relates to a borehole inspection device or system that has a configuration that allows it to be operated "wirelessly" as is defined by the application, but this is not required. Yet further, it can quickly and accurately measure the condition of the borehole including, but not limited to, accurately measure and/or determine the configuration of the bottom and/or side wall(s) of the opening or excavation to provide fast and reliable information about the quality, shape, radius and/or verticality of the borehole and/or excavation.

According to one aspect of the present invention, provided is a system that includes a scanner or sensor arrangement that can be directed within the borehole, excavation or shaft hole to scan, sense and/or detect the surfaces of the bottom and/or sides of the borehole to determine one or more characteristics of the opening.

According to another aspect of the present invention, provided is a system that includes a sensor arrangement that can be essentially a self contained sensor arrangement that can be directed within the borehole or opening. In that the sensor arrangement can be self contained, the device can be a "wireless" device wherein the self contained device is directed into the borehole.

In one set of embodiments, the sensor arrangement can communicate wirelessly with an operator and/or system outside of the borehole and/or off site. As will be discussed throughout this application, a "wireless" system can be any system that allows the downhole portion of the device to be used without being hard wired to an external system not lowered in the borehole. This can include, but is not limited to, a) use of a wireless operating and/or communication arrangement that allows the downhole portion of the system to be operated independent of and/or communicate with external system(s) without communication wires and b) includes a data management system that allow the downhole portion of the system to be self contained and communicate data after a data measurement cycle is completed and, the downhole portion is removed from the borehole and/or after the downhole portion returns to the surface of the borehole. The preferred versions of these arrangements will be discussed more below and these preferred versions are intended to be examples only and are not intended to limit this application.

In another set of embodiments, the sensor arrangement can retain data and then communicate that data on demand. This can include, but is not limited to, communicating the data after the system has cycled through the borehole and the sensor arrangement is at least partially removed from the borehole. While not preferred, a wired communication system could be utilized for this communication of data.

According to yet another aspect of the present invention, provided is a system that includes a sensor arrangement that is mountable to a Kelly Bar, the main line or cable used in the excavation and/or boring, and/or any other lowering device known in the industry that is used to dig, excavate, bore and/or clean out the borehole and/or excavation. By using wireless technology and/or a self contained design, the system can be deployed more quickly than prior systems. Yet further, any wireless technology and/or data management systems could be used with the device of this application.

According to even yet another aspect of the present invention, provided is a system that can include a self contained sensor arrangement, which is configured for inspecting a borehole. Further, the system includes a—sensor arrangement that eliminates the need to rotate the device in the borehole, which is necessary in the prior art. As can be appreciated, this can further simplify the system. Further, it can improve accuracies and response times compared to existing systems.

According to further aspects of the present invention, provided is a system for inspecting a borehole that includes a sensor arrangement having circumferentially spaced sensors and/or testing devices that are circumferentially spaced about a device or head axis and extend radially outwardly from the device or head axis. This has been found to further reduce the need to rotate the device by allowing the sensor arrangement to simultaneously test at least a large portion of the borehole wall(s) around the entire sensor device. Further, this can include multiple sets of sensors that are staggered relative to one another to allow for a greater portion of the borehole wall(s) to be scanned simultaneously. In one set of embodiments, the multiple sets could be axially spaced from one another along the head axis.

According to yet other aspects of the present invention, provided is a system for inspecting a borehole that includes a sensor arrangement that includes multiple sets of sensors that are configured for different conditions found within the borehole. In this respect, one set of sensors (that includes one or more first sensors) could be configured for dry environments while one or more other sets of sensors (that includes one or more second sensors, etc.) could be configured for wet or slurry environments.

According to other aspects of the present invention, provided is a system for inspecting a borehole that includes a sensor arrangement that includes sensors, receivers and/or reference members at known spacings that can be used to measure changes in the slurry density and/or wave speeds as the device is lowered into the borehole.

According to yet even other aspects of the present invention, provided is a system for inspecting a borehole that includes a depth measurement system and/or depth control system. The depth measurement system and/or depth control system can include multiple pressure sensors. In a preferred arrangement, this system includes at least two pressure sensors that are at known spacings to one another and axial spaced from one another by a known spacing. The depth measurement system can include one or more accelerometers, one or more altimeters, timers, clocks, rotary encoders, or any other depth measuring systems known to calculate and/or measure depth of the sensor arrangement. As with other aspects of the system and/or arrangement, the calculated/measured depth can be stored and/or selectively communicated to other parts of the system.

According to further aspects of the present invention, the system can include one or more accelerometers and/or one or more altimeters to determine the verticality of the system within the borehole. Further, the verticality measurements of the scanner system can be used to complement scanner system measurements. Yet further, the system can further include a rotary encoder fixed relative to a Kelly Bar (or other lowering device) that can measure depth either independently and/or in combination with other devices including, but not limited to, pressure sensors(s), accelerometers, timers, clocks and/or altimeters. When used in combination, the rotary encoder can be synced with the pressure sensor(s), accelerometers, timer, clocks and/or altimeters to further improve accuracies in depth measurement.

According to even yet other aspects of the present invention, the depth of the system within the borehole can be calculated, at least in part, using two or more pressure sensors having known vertical spacings wherein the pressure sensors can work together to detect depth. The depth is detected based on the changes in the slurry density and this can be used to determine the depth of the sensor arrangement.

According to yet further aspects of the present invention, the use of rotary encoder, pressure sensors, accelerometers, timers, clocks and/or altimeters, in combination with other aspects of the invention and/or wireless technology eliminates the need for wires and/or lines connecting the lowered device to surface systems and/or operator(s) monitoring the borehole inspection on site or off site during data collection.

According to other aspects of the present invention, a timing system can be included to synchronize one or more components of the sensor system thereby allowing the system to be "wireless." In this respect, the system can include a lower arrangement that is configured to lower the sensor arrangement into the borehole. The lower arrangement can include a lowering timer and the sensor arrangement can include a sensor timer. The lowering timer and the sensor timer can be synchronized. Moreover, sensor data can be measured as a function of time and depth can be measured as a function of time wherein the sensor data and the depth data can then be synchronized with respect to time to determine the depth of the sensor data. This data can then be communicated by wire and/or wirelessly during and/or after the test to allow wireless operation during the data collection phase.

According to even yet further aspects of the present invention, the use of rotary encoders, accelerometers, timers, clocks and/or altimeters in combination with wireless technology better allows for semi-automation and/or full automation of the inspection process. Yet further, multiple boreholes could be inspected simultaneously with a device and system of this application by a single operator and/or single operating system.

According to another aspect of the invention of this application, the devices of this application can also work in combination with other systems for borehole inspection. This can include, but is not limited to devices used to measure the bearing capacity of the soils underneath the shaft bottom and/or the bearing capacity the side walls of the shaft opening.

More particularly, in one set of embodiments, the system can work in combination with devices configured to measure soil resistance by utilizing a reaction load and this reaction load can be a substantial reaction load produced by the weight of the already present and massive drilling equipment.

According to yet another aspect of the invention of this application, the system can work in combination with devices that can measure a reaction load to both determine the depth of the debris layer on the surface of the bottom of the borehole bottom and measure the load capacity of the bearing layer of the borehole below the debris layer.

According to a further aspect of the invention of this application, the system can work in combination with devices that can measure the bearing capacities of the side wall and thus potentially save more money by justifiably reducing the safety margin as the bearing capacity is better known).

According to a further aspect of the invention of this application, the system can include multiple sensors and these multiple sensors can detect and test more than one characteristic of the borehole. As noted above, the use of multiple sensors can also prevent the need for the rotation of the device.

According to another aspect of the invention of this application, the system can be configured to quickly connect to the drilling equipment wherein separate and independent lowering systems are not required thereby eliminating the need for setting up cumbersome additional equipment and reducing to a minimum any time delays between the end of the drilling process and the beginning of concrete casting.

According to yet another aspect of the invention of this application, the system can work in combination with devices that include both force and displacement sensors thereby measuring both the amount of debris and/or the bearing capacity of the bearing layer of the borehole bottom and/or sides.

According to yet other aspects of the present invention, the system can include the sensing on the head unit that is lowered into the borehole and a surface system (on site or off site) that can be in communication with the head unit and that can display real time data viewable by the operator of the device, personnel on site and/or personnel off site thereby preventing the system from being removed from the borehole for each location tested on the borehole bottom, thus improving efficiency and reducing the time required for testing.

These and other objects, aspects, features, advantages and developments of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
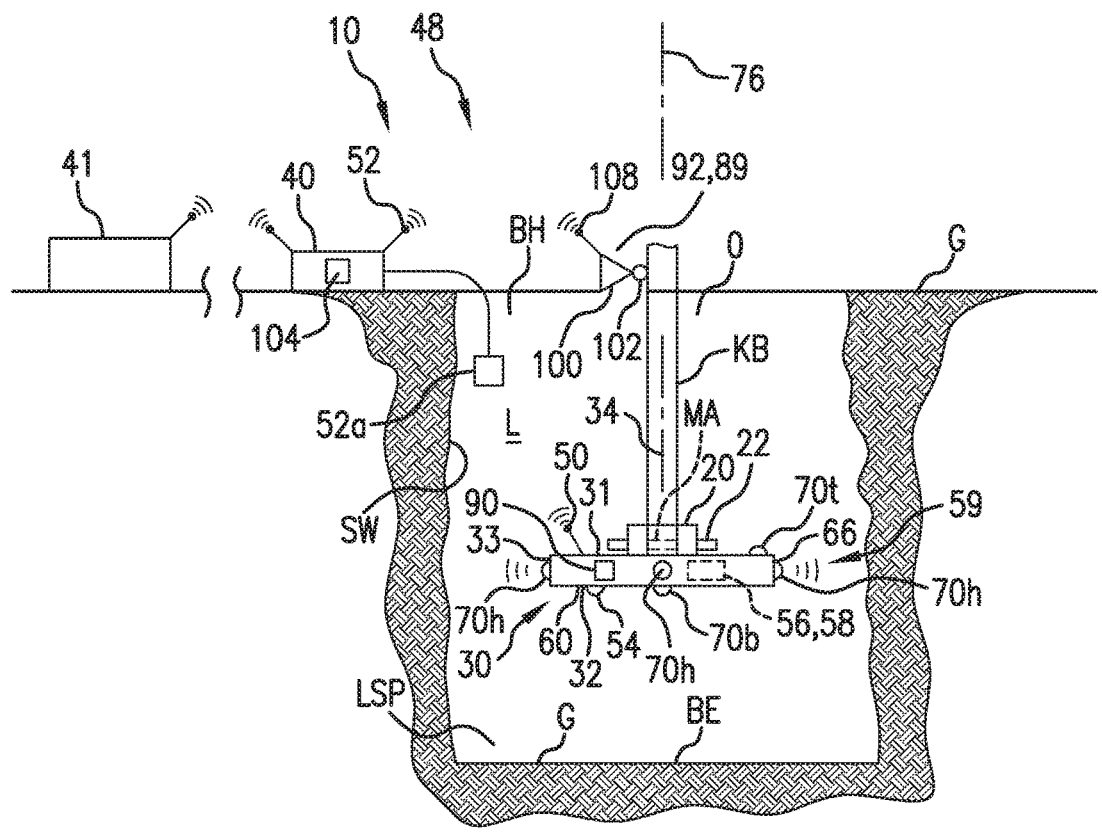
FIG. 1 is a side elevational view a borehole inspection device according to certain aspects of the present invention that is positioned within a bore and/or excavation hole.
Figure 2:
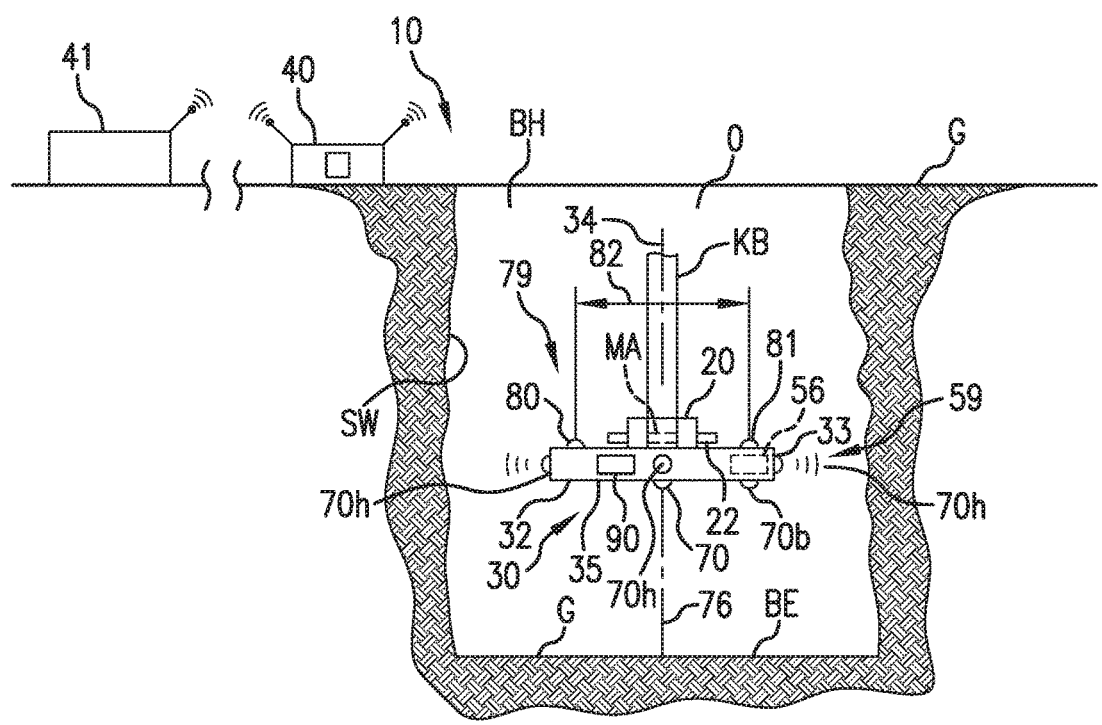
FIG. 2 is a side elevational view the borehole inspection device shown in FIG. 1 descending within a slurry.

Referring now to the drawings wherein the showings are for the purpose of illustrating preferred and alternative embodiments of the invention only and not for the purpose of limiting the same, shown is a borehole inspection device or system 10 that includes one or more components that are mountable, fixed relative to and/or mounted to a lowering device, such as a Kelly Bar KB or a lowering cable. In this respect, while the invention of this application is being described in connection with a Kelly Bar, the inspection device can connected to any equipment or system used to excavate, bore, lower and/or inspect the opening including, but not limited to, being mountable to a Kelly Bar, a main cable line, main chain line, excavation and/or boring equipment, and/or any other lowering device known in the industry that is used to dig, excavate, bore, lower and/or clean out the borehole and/or excavation. Therefore, while the invention is being described for use in connection with a Kelly Bar, it is not to be limited to a Kelly Bar. The Kelly Bar KB or other lowering device can include a mounting arrangement MA that allows a mount 20 to secure some or all of the device or system 10 relative to the lowering device KB. The mount can be sized to slide over the end of the Kelly Bar and can include a locking feature, such as a pin 22, to secure the device to the bar, which will be discussed in greater detail below. However, any attachment configuration could be used without detracting from the invention of this application.

In greater detail, borehole inspection device or system 10 includes a downhole testing head unit or head assembly, unit or arrangement 30 that can be lowered into a borehole BH wherein the borehole has one or more sidewalls SW extending between a top opening O in a ground layer G and a bottom extent BE. Bottom extent BE defines the borehole bottom. System 10 can further include one or more surface control and/or display unit(s) 40 that can be in direct communication with head unit 30, but this is not required, which will be discussed more below.

Head unit 30 can be any configuration without detracting from the invention of this application. As is shown, Head unit 30 includes a top 31 and an opposite bottom 32. Head unit 30 further includes one or more side 33 that extend radially outwardly from a head unit axis 34. Head unit 30 further includes an outer layer or shell 35 and one or more watertight internal regions 36, which will be discussed more below. As will be discussed more below, head unit 30 can be positioned within the borehole such that head unit axis 34 is plumb wherein system 10 can further detect the verticality of the borehole to determine whether the borehole is plumb within the ground surface along its length.

In one set of embodiments, head unit 30 is in direct communication with surface unit(s) 40 by way of one or more wireless communication systems 48. This direct connection can be in real time and/or intermittent as is desired and/or required. In these embodiments, wireless communication systems 48 is a wireless communication system that includes a first wireless antenna (internal and/or external) 50 connected to head unit 30 and a second wireless antenna (internal and/or external) 52 connected to surface control unit 40. These antennas can utilize any technology known in the art and are preferably transceivers that both send and receive data. Further, the antenna technology can depend on the whether the Borehole is filled with air or liquid L (such as a slurry). In one set of embodiments, control unit 40 can include an antenna 52a that is at least partially submerged in liquid L that is within the borehole. Yet further, the wireless technology can also utilize the central opening in the Kelly Bar to transmit data in boreholes that are filled with liquid L to allow for transmission through air instead of the borehole liquids. As can be appreciated, transmission through slurries eliminates many wireless technologies wherein use of the internal cavity of the Kelly Bar could allow for their use, such as use of optical wireless technologies. Wireless communication system 48 allows head unit or assembly 30 to communicate with surface control unit 40 during a data collection phase and/or a data transmission phase without the need for wires thereby further simplifying the setup of system 10 simplifying the operation of the system, but this is not required. As can be appreciated, wired communication during data collection can involve long lengths of communication wires or lines that must be managed at the jobsite. Further, wires on the jobsite can be damaged, which can create downtime. Yet further surface control and/or display unit(s) 40 can be an on-site unit that is located at or near the bore hole, at any location onsite, or can be an off-site unit located at a remote location wherein the borehole work for one or more boreholes is done by engineers that are offsite. Yet further, the system can further include a separate offsite control and/or display unit(s) 41 that works with on site surface control and/or display unit(s) 40 or directly with head unit 30. Any system of communication known in the art can be used to communicate to, or from, the off-site location.

Head unit 30 can further include a self contained power supply 56 to provide electrical power to operate an internal measurement system 58 of the head unit, which will be discussed in greater detail below. Power supply 56 can be any power supply known in the art including re-chargeable power systems. Yet further, power supply 56 can include the use of interchangeable and/or rechargeable battery packs that allow for a longer operational life of the battery system. In that rechargeable battery systems are generally known, these will not be discussed in greater detail in the interest of brevity.

Surface units 40 and/or 41 can be any control unit configured to operate a system and/or collect data including, but not limited to, a computer system, a laptop, a tablet, a smart phone, a hand held system, a wrist mounted system and/or the like. In that these types of systems are known in the art, details are not included in this application in the interest of brevity.

In different embodiments of this application, differing portions of system can be within downhole head unit 30 without detracting from the invention of this application. The same is true concerning units 40 and/or 41. In this respect, some or all of the operating system for system 10 could be an integral part of internal measurement system 58 of head unit 30 wherein unit 40 could have more of a display, data transmission and/or data storage function. In other embodiments, surface unit 40 is a display and control unit wherein head unit 30 operates based on instructions received from surface unit 40. Accordingly, the operating system could be in either device and/or both devices. In any arrangement, the overall device could include one or more preprogrammed operation modes configured to automatically perform one or more desired testing routines and/or guide the system within the borehole. This can include the one or more operational steps for unit 30 during the data collection phase. Further, this preprogramed operation could include guiding the system based on input from one or more of the sensors that will be discussed more below. The wireless communication system can be any wireless system known in the art including, but not limited to high frequency ultrasonic technology. Further, the wireless technology can operate on different frequencies based on the material that it is communicating through. This can include, for example, operation at in the range of about 0.5 to 2 MHz in wet or slurry conditions and in the range of about 10 to 100 KHz in dry conditions. In one set of embodiments, operation is at about 1 MHz in wet or slurry conditions and about 20 to 60 KHz in dry conditions; preferably around 40 KHz. Yet further, the wireless communication system can include one or more liquid sensors 54 to determine whether head unit is in a wet or dry condition, which can be used to automatically or manually switch the system to and from wet or dry modes. Liquid sensor 54 can be a part of internal measurement system 58. In one set of embodiments, sensor 54 could include an ultrasonic sensor and/or use one of the ultrasonic sensors discussed in greater detail below.

Downhole head unit 30 can operate in differing levels of independence without detracting from the invention. In this respect, head unit 30 can operate independently of units 40 and/or 41 when it is in the data collection phase of the testing, but operate with units 40 and/or 41 when in the data transmission phase. In this application, the data collection phase is when head unit 30 is within borehole BH and is testing the borehole. The data collection phase can include a lowering phase wherein head unit 30 is being lowered in the borehole from borehole opening O toward bottom extent BE and/or a raising phase wherein the head unit is being raised in borehole BH from bottom extent BE toward opening O and any subsets thereof. Test data can be taken in either or both of these phases.

Figure 5:
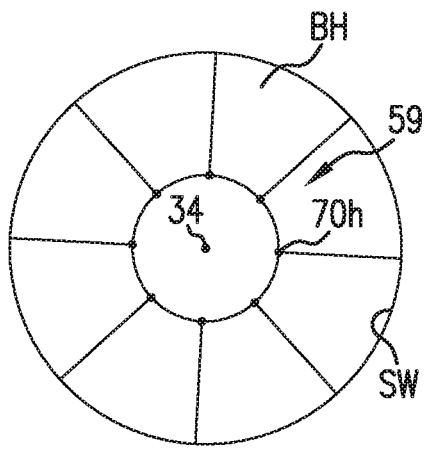
FIG. 5 is an enlarged schematic view of a sensor array in a first orientation.
Figure 6:
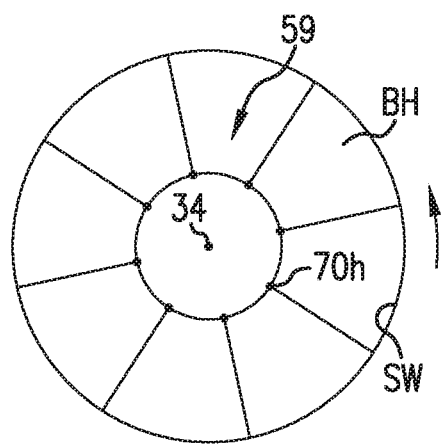
FIG. 6 is an enlarged schematic view of the sensor array shown in FIG. 5 in a second orientation.
Figure 7:
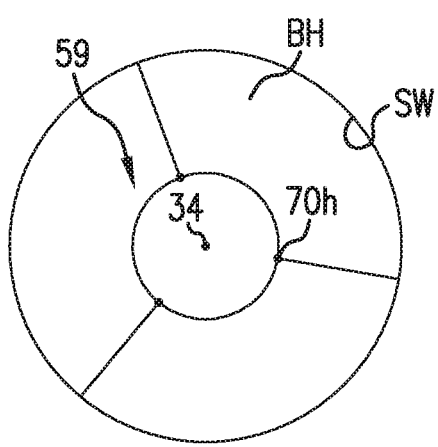
FIG. 7 is an enlarged schematic view of another sensor array.
Figure 10:
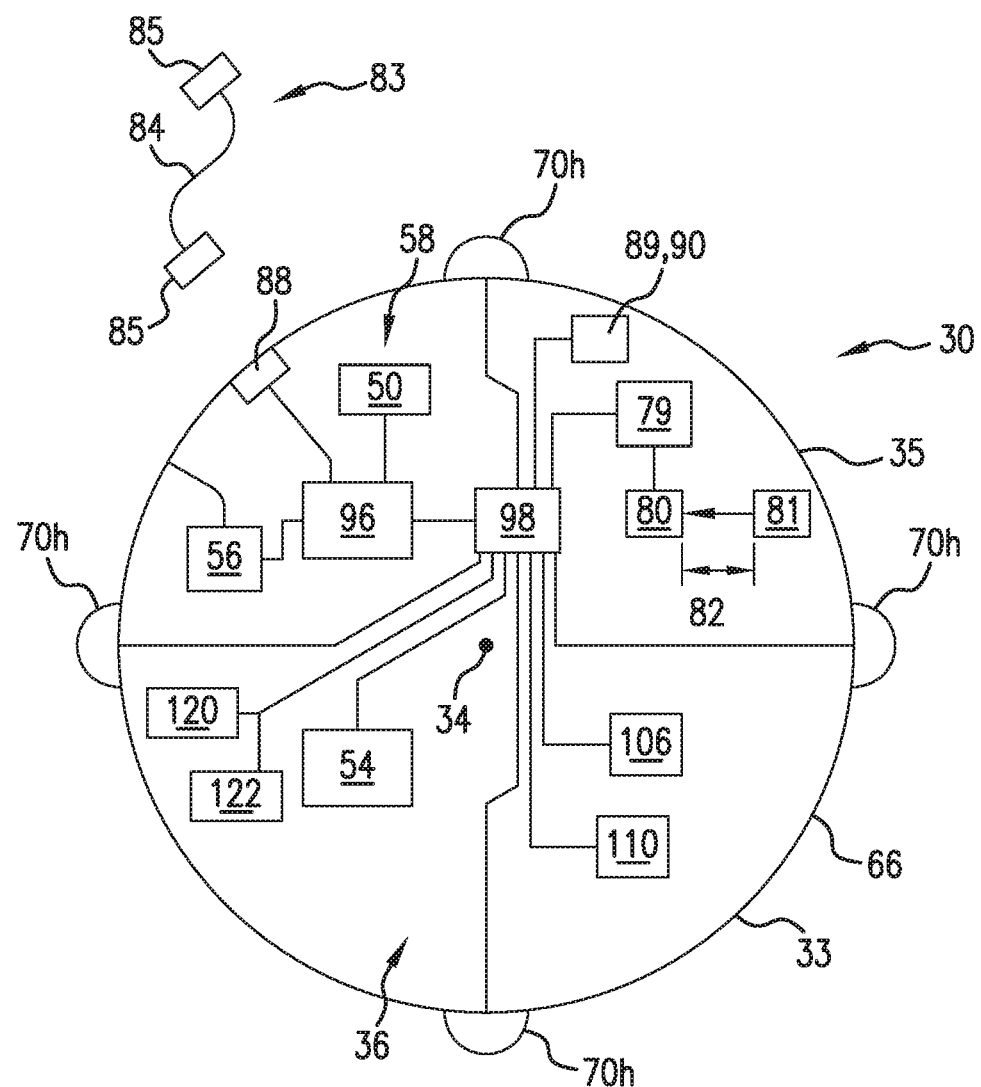

In one set of embodiments, data is obtained based on sensor readings that are taken in the lowering phase from a sensor arrangement 59 that includes sensors 70, which will be discussed more below. Then, after head unit reaches a lower stop point LSP, which can be a set point at or above bottom extent BE, head unit 30 and/or sensor arrangement 59 can be rotated about a system axis 34. Once the rotation is completed, data can be taken during the raising phase without rotation. With reference to FIGS. 5 and 6, shown are two orientations of the sensor arrangement 59 of head 30, which will be discussed more below. In this embodiment, the sensor arrangement includes eight sensors 70*h* in 45 degree circumferential increments that can be in a first orientation (FIG. 5) during the lowering phase, and then rotated by 22.5 degrees after head unit 30 reaches lower stop point LSP. Then, during the raising phase, head unit 30 can take data readings in a second orientation (FIG. 6). This doubles the measured angular resolution of a single vertical scan. For the head units that include four horizontal sensors 70*h* (FIGS. 1 & 10), the head unit 30 could be rotated 45 degrees. Yet further, the data collection phase could include multiple lowering and raising phases ("multiple measuring cycles") with a smaller degree of rotation to produce a higher degree of angular resolution for the overall test data.

Wireless communication and/or operation relating to the independent operation of downhole head unit 30 can be, and is defined as, any form of communication that does not require a direct wired connection between units 40 and/or 41 and head unit 30 and/or sensor arrangement 59 during the data collection phase. In this respect, system 10 includes measurement system 58 that allows the operation of head unit 30 and/or sensor arrangement 59 without a wired connection. This can include, but is not limited to, wireless communication system 48 between downhole head unit 30 and units 40 and/or 41 during the data collection phase. This wireless communication between downhole head unit 30 and units 40 and/or 41 during the data collection phase can be limited to data transmission from downhole head unit 30 only. In another set of embodiments, wireless operation can include head unit 30 that operates independent of units 40 and/or 41 during some or all of the data collection phase and communicates with units 40 and/or 41 during the data transmission phase that can be independent of the data collection phase. In this respect, the data transmission phase of downhole head unit 30 can be limited to after the completion of the data collection phase and this transmission can be by either wired and/or wireless transmission without changing the designation of the system as being a "wireless" communication and/or operating system. This includes wired and/or wireless transmission from the downhole head 30 unit after head 30 is at or near the top of the borehole and/or has been removed from the borehole. But, operations of head 30 while in the borehole during the data collection phase are without wired communication wherein operations are "wireless."

Yet even further, if head unit 30 is a self-contained unit as is defined by this application, unit 30 can operate at least partially independently wherein head unit 30 could even eliminate the need for onsite computing system and/or merely need onsite computing systems to be a conduit to one or more offsite systems. For example, head unit 30 could be configured to transmit directly to an offsite location system 41, such as transmitting directly to a cloud computing location or system during the data collection and/or transmission phases based on a direct connection such as by way of a cellular connection between head unit 30 and a cellular service.

However, as can be appreciated, independent operation can take many forms without detracting from the invention of this application wherein in this application, independent operation means that head unit 30 can perform at least some functions without a wired link to a surface system, such as units 40 and/or 41. There are many degrees of independent operation that include, but are not limited to, a) full independence wherein all operating systems, commands, data storage and the like are part of internal measurement system 58 of head unit 30 wherein unit 30 is a fully functional system by itself. The data collected during the data collection phase is thus completely independent of surface systems, such as units 40 and/or 41. b) partial independence wherein head unit 30 includes independent operations but system 10 includes one or more of the commands, data storage and the like at least partially controlled by units 40 and/or 41. This can include, but not limited to, use of units 40 and/or 41 to program a preferred mode of operation for the data collection phase of head 30, receiving data during the data collection phase, providing at least some of the operating steps and/or controlling one or more synchronization clocks. c) substantial dependence wherein head unit 30 is substantially controlled by units 40 and/or 41 during the data collection phase. Again, while examples have been provided, these examples are not exhaustive wherein differing variations of these operation modes are contemplated with the invention of this application.

Head unit 30 can include a wide range of configuration without detracting from the invention of this application. For discussion only, wherein the following description is not intended to limit the invention of this application, head unit 30 can include a head plate and/or assembly 60 that includes top portion 31, bottom portion 32 and one or more sides 33. Head unit can be round as is shown in the drawings, but this is not required. Head unit 30 further includes one or more sensor arrangements 59 for determining the physical characteristics of the borehole wall, the physical characteristics of the borehole bottom and/or to help in the operation of the system, which will be discuss more below. These sensor arrangement(s) can have a wide range of functions and/or uses and can work in combination with other sensors or autonomously.

The sensor arrangements can include liquid sensor 54 noted above that can work to help the operation of the device. The sensor arrangements further include one or more scanners or sensors 70 for the measurement of the physical characteristics of the borehole. In this respect, sensors 70 are configured to scan, sense or detect the borehole walls, borehole bottom borehole opening and/or the top extent of liquid L to determine the locations of these items relative to head unit 30, sensor arrangement 59 and/or plate 60. In the embodiments shown, these sensors can be oriented as needed to obtain desired data. In this respect, sensors 70h are radially outwardly facing sensors relative to head axis 34. In that these sensors are measuring radially outwardly from head unit axis 34, the data obtain from these sensors is described as a radius spacing between axis 34 and a portion of sidewall SW that is located radially outwardly of the particular sensor 70h, which will also be described in greater detail below. Head unit 30 can further include sensors 70t and/or 70b that can be utilized to scan the bottom extent to determine the condition of the surface of bottom extent BE and/or to help determine the location of unit 30 relative to the top and/or bottom of the borehole. Again, this can be used to help make unit 30 a self contained system.

Sensors 70 can utilize a wide range of scanning technology without detracting from the invention of this application. The data produced by the sensors can be used to provide dimensional data on the borehole including, but not limited to, the dimensions of the borehole size as radius, the detection of imperfections in the borehole wall, the shape of the borehole wall, vertical orientation and/or any other dimensional characteristics of the borehole wall. And, multiple sensors can be circumferentially spaced about axis 34 to prevent the need to rotate head 30, and/or assembly 60 and/or improve the resolution of the data obtained. In one set of embodiments, sensors 70 include at least one sonar sender and/or receiver (or transceiver) that can be, or is, directed at the surface to be analyzed. Sensors 70h are directed at a portion of sidewall SW. This also can include the use of one or more ultrasonic sensors. This can include, for example, operation in the range of about 0.5 to 2 MHz in wet or slurry conditions and in the range of about 10 to 100 KHz in dry conditions. In one set of embodiments, operation is at about 1 MHz in wet or slurry conditions and about 20 to 60 KHz in dry conditions. No matter what sensor is used, a plurality of sensors in sensor arrangement 59 can together calculate a general three-dimensional shape of the borehole and/or the radius of the borehole along its length between opening O and bottom extent BE, or at least a portion thereof. Depending on the number of horizontal sensors 70h, this can be done without the need for rotation between the lowering phase and the raising phase between the top extent of the measurement and lower stop point LSP. At least, it can reduce the number of the measuring cycles needed for a desired resolution. Yet further, head unit 30 and/or system 10 can use different technologies for different environments. In this respect, sensors 70 can include ultrasonic sensors for wet or slurry conditions and/or ultrasonic, laser and/or optical sensors for dry conditions. In addition, the ultrasonic sensors can be configured for use with both wet and dry conditions. In this respect, the ultrasonic sensors can be configured to transmit at different frequencies so that the ultrasonic sensors could be operated at higher frequencies for liquids or slurries and operated at lower frequencies for air. Yet even further, the system can include a sensor arrangement 59 that includes multiple sets of different sensors configurations and/or types wherein one set of sensors can be used for dry conditions and another set of sensors can be used for wet conditions. Moreover, these multiple sets could include a first set that has one or more ultrasonic sensors configured to operate at higher frequencies for liquids or slurries and a second set that has one or more ultrasonic sensors configured to operate at lower frequencies for air.

Sensor 70 of head unit 30 can also include sonar transducers which can scan a portion of sidewall SW of the borehole and/or a portion of bottom BE of the borehole with an ultrasonic signal. Again, multiple sonar sensors can be configured to send in multiple directions to prevent the need to rotate head 30 and/or sensor arrangement 59 during data collection as is defined in this application. In this respect, head unit 30 extends about head unit axis 34 and head 30 can be positioned in borehole BH such that axis 34 is generally coaxial with a borehole axis 76, but this is not required and will likely change as unit 30 is lowered into the borehole. In this respect, sensors 70h face radially outwardly from axis 34 of head unit 30 and measure the spacing between the sensor and sidewall SW. This measurement from multiple sensors 70h can then be used to determine the overall radius of the borehole and the location of head unit 30 relative to the borehole. This can be used to determine if the borehole is vertical, if the borehole changes direction, the radius of the borehole and/or if the borehole has any imperfections in its side wall SW. As can be appreciated, head 30 can be positioned in borehole such that head axis 34 is substantially coaxial with borehole axis 76. Then, as the head is lowered, sensors 70h can detect if borehole axis 76 remains coaxial with head axis 34. If the head is being lowered such that head axis 34 is plumb, this is an indication that the borehole is not plumb. Again, while sensors 70h could be a single sensor, it is preferred that head unit 30 includes a plurality of circumferentially spaced sensors 70h positioned about head unit axis 34 that face radially outwardly from axis 34. In this configuration, head unit 30 does not have to be rotated during the data collection phase, which has been found to increase accuracies and greatly reduce testing times.

Yet further, sensor arrangement 59 and sensors 70, including sensors 70h of sensor arrangement 59, can include a wide range of operating modes and these operating modes can be controlled by internal measurement system 58 and/or sensor arrangement 59. In this respect, system 10 can include a sensor arrangement 59 that operates all sensors 70h simultaneously, which is operation in parallel. In another set of embodiments, the sensors, such as sensors 70h, can operate in sets. For example, all of the even sensors 70h could operate during a first testing period and all of the odd sensors could operate during a second testing period. In yet other embodiments, one type of sensor could operate during a first testing period and other types could operate during a second testing period. This includes the operation of one or special application sensors, such as the depth sensors.

As is shown in FIG. 1, unit 30 includes a sensor arrangement 59 having multiple sensors 70. Again, this reduces the need to rotate head unit 30. Sensors 70 includes a first set of sensors (70h) positioned on the one or more of side edges 66 of head unit 30 circumferentially spaced about axis 34 or at least radially extending from axis 34. In the embodiment shown in FIG. 1, there are four horizontal sensors 70h circumferentially spaced about head axis 34. However, as is shown in FIGS. 5-8, more or less sensor could be used without detracting from the invention of this application. As can be appreciated, more sensors can improve resolution, reduce testing times and/or reduce the number of measuring cycles. By including the use of wireless technology and anti-rotation sensor arrangements to prevent the need to rotate the head, head unit 30 operation can be simplified significantly, testing times can be improved and accuracies can be improved. Further, the head unit can be a self contained head unit that can be quickly set up and lowered into the borehole. In one set of embodiments, head unit 30 includes support bracket 20 that can work in connection with mount MA on existing lowering systems being used at the jobsite, such as Kelly Bar KB and/or lowering cables. Again, while any mounting arrangement could be used to secure head unit 30 to a lowering device, Kelly Bar KB, shown mount 20 utilizes pin 22 to secure head unit 30 to the Kelly Bar.

Again, the data collected by sensor arrangement 59 from sensors 70 can be transmitted to the surface unit 40 by way of the wireless technology. In one set of embodiments, the wireless communication is by communication system 48 and antennas 50 and 52 or 52a. In another set of embodiments, data is communicated directly from head unit after the data collection phase. In this respect, unit 30 can be self contained during at least the data collection phase of the operation. Moreover, internal measurement system 58 of head unit 30 can include a memory 96 and memory 96 can include operating instructions for a head processor 98 to control the data collection phase, store the data collected during the data collection phase and/or communicate the data during the data transmission phase. In some embodiments, the memory for the data memory is independent of the memory for the operating instructions. Then, after the data collection phase is concluded, the head unit can be raised to the top and the data can be downloaded from head unit 30 directly after it has surfaced. This extraction of data can also be by way of wireless communication using antenna 50 and/or it could include a wired communication arrangement 83. Wired communication arrangement 83 can include a selectively securable cable 84 having cable connections 85 wherein cable 84 can be selectively securable between a data port 86 in surface unit 40 and/or 41 and a data port 88 in head unit 30. In addition, this can be limited to when the head unit is in the data transmission phase, which can be when the head unit is at least partially out of the borehole. As can be appreciated, wireless and/or wired communication between head unit 30 and surface unit 40 and/or 41 is much different when the head unit is out of the borehole than communication with head unit 30 when it is in the borehole during the data collection phase. Again, any communication system and/or technology could be used including all of the typical wireless RF or optical communication links used by industry. RF links include, but are not limited to, BLUETOOTH®, ZigBee®, Wi-Fi, Universal Serial Bus and RS232 communication standards and/or systems. Optical communication links include, but are not limited to, Li-Fi.

While mounting head unit 30 to the Kelly Bar can allow the head unit to be rotated, the exact angle of rotation would be needed to accurately determine the portion of the side wall and/or bottom wall being measured at any given time. In the embodiment shown in FIG. 1, head unit 30 includes sensor arrangement 59 having five sensors 70. These include four horizontal sensors 70h and one bottom sensor 70b. Again, more or less than five sensors could be used without detracting from the invention of this application.

Again, sensors 70 in one set of embodiments can be one or more ultrasonic sensors that can be used to detect the spacing or distance between the sensor and the side wall. Multiple readings from multiple sensors can then be used to calculate the shape and/or configuration of any surface within the borehole. In particular, horizontal sensors 70h can be used to detect and determine the shape and/or overall radius of the sidewall(s) of the borehole. Bottom sensor or sensors 70b can be used to detect and determine the shape of bottom surfaces BE of the borehole. Alternatively, bottom sensor or sensor 70b can be used to detect and determine the location of bottom extent BE and/or lower stop point LSP.

Figure 3:
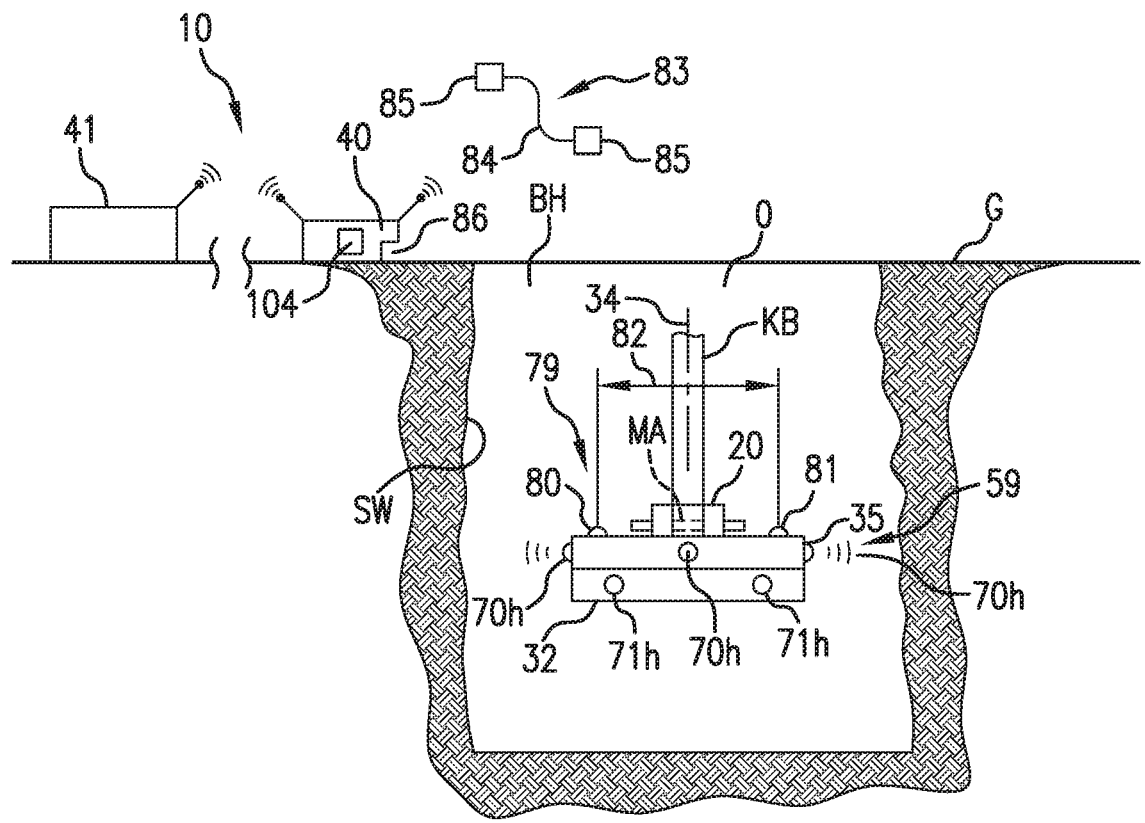
FIG. 3 is a side elevational view yet another borehole inspection device according to certain other aspects of the present invention that is positioned within a bore and/or excavation hole.
Figure 8:
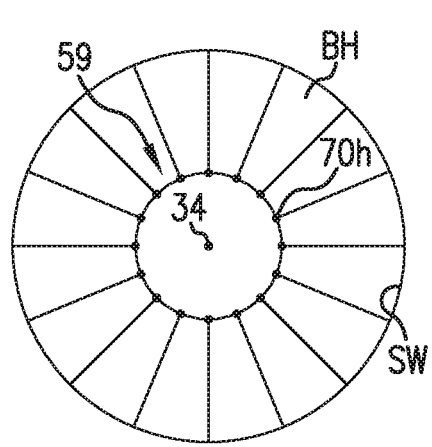
FIG. 8 is an enlarged schematic view of yet another sensor array.

In another set of embodiments, sensors 70 can include one or more laser and/or optical sensor could be utilized to take the same or similar readings. These sensors are intended for holes that are not filled with a slurry. In addition, in at least one set of embodiments, the device can include sensor arrangement 59 with a combination of sensors wherein the one or more ultrasonic sensors can be utilized in the scanning within a liquid or slurry and the one or more laser, ultrasonic and/or optical sensors could be utilized in dry conditions. With special reference to FIG. 3, sensor arrangement 59 can include a first array of sensors 70h and a second array of sensors 71h. These arrays of sensors extend about unit axis 34 and/or can be positioned in multiple layers and/or sensor arrays that can include use of the same sensor technology and/or different sensor technology. In this respect, an increasing number of sensors can be used to improve the angular resolution of the device. Different scan technology can be used to allow one head unit 30 to work in different borehole environments. Therefore, at least one set of embodiments includes sensors positioned about most of the side(s) (at least radially outwardly) of the device to improve resolution. If a sensor is used that includes a narrow sensor range that are highly directional, a greater number of sensors could be used without interference with adjacent sensors. As noted above, this can improve angular resolution. In one set of embodiments, this can include over ten sensors spaced about the side or radially extending from unit axis 34 of the head device. FIG. 8 shows 16 sensors 70h. According to another set of embodiments, over twenty sensors could be positioned about the side or radially extending from unit axis 34 of the device. According to yet another set of embodiments, over thirty sensors could be positioned about the side or radially extending from unit axis 34 of the head device. Depending on the size of the side sensors, the head unit and/or other factors, more than one layer or sets of sensors could be positioned about the axis of the device. These other layers or sets could also utilize a different sensor technology. Again, in one mode of operation, the head unit can be lowered into the borehole or excavation (lowering phase) until it reaches lower stop point LSP. Then, head unit 30 and/or sensor arrangement 59 can be partially rotated before the raising phase. This can be used to improve the angular resolution of the device by changing the rotational position of the device when raised to change the rotational orientation of the sensors relative to the wall(s). This rotation method can also be used to address gaps in the sensors' data when fewer sensors are used and/or when highly directional sensors are used.

According to yet another set of embodiments, sensor arrangements 59 can further include one or more calibration sensor arrangements 79. Calibration sensors can have a wide range of functions including, but not limited, depth measurement and/or confirmation, density measurement and/or confirmation, and/or other operational functions. These include one or more sensors configured to measure the density of the slurry about head unit 30 as will be discussed more below. In this respect, head unit 30 can include one or more devices, like the scanners and/or sensors described above, that are directed toward other devices at known locations, which can be used to determine and account for the changes in slurry densities as the devices is lowered into the borehole. In this respect, the fluid or slurry that is used to maintain the borehole until it is filled with material to be solidified, such as grout, has different densities at different depths. Further, changes in density will affect the wave speed of the sonar sensors of sensor 70 wherein wave speed slows as density increases. Therefore, the accuracy of the system can be impacted as the density of the slurry changes. In order to account for the changes in slurry density, the invention of this application can further include one or more density sensors 80. Sensor 80 can be a single unit device directed toward an object at a known location 81 or a transmitter 80 and a receiver 81 at a known location wherein units 80 and 81 are spaced from one another by a known spacing 82. In that the spacing is known, density sensor 80 can be utilized to calibrate head 30 and/or system 10 by calculating changes in the slurry density. This calibration information can then be used to adjust sensor readings from sensors 70. Yet further, the density sensor 80 could also work with depth sensors, such as pressure sensors 110, which will be discussed more below. This can be used to increase accuracies of the depth measurement of the system and/or the accuracy of the sensors.

Again, in one set of embodiments, device 80 can be a transmitting device and device 81 can be a receiving device wherein known spacing 82 is the distance between the transmitter and the receiver. The density measurement can then be made by tracking the time delay, and changes in time delay, from the received signal sent from the transmitter to the receiver. This can then be used to adjust sensor readings from sensors 70 to account for the changing density of the slurry at any depth within the borehole. Further, receiver 81 could also be used in combination with one of sensors 70 wherein at least one of sensors 70 acts as unit 80 and receiver 81 is positioned at know distance 82 from the one of sensors 70. Again, the changes in transmission times from receiver 81 can be used to calculate density. Calibration system along with density sensor 80 and receiver 81 can be a part of measurement system 58.

Borehole inspection device 10 can further include one or more depth measurement systems 89. As can be appreciated, knowing the depth of head 30 and/or sensor arrangement 59 is important to know where the scanned images are located within the borehole. Depth measurement systems 89 can include one or more internal measuring systems 90, that can be part of system 58 of head unit 30. System 90 can include, but is not limited to, accelerometers, gyroscopes, ultrasonic sensors, altimeter(s) 91, and/or pressure sensors 110 to determine the depth of the system within the borehole and/or changes in depth. And, these systems can be used with other systems to determine current depth for head 30. Yet further, the depth measurement systems 89 can include a rotary encoder 92 fixed relative to a Kelly Bar, a lowering cable, main line and/or other lowering device, that can measure depth either independently and/or in combination with the other systems within head unit 30. The rotary encoder 92 can include a support 100 and a wheel 102 wherein wheel 102 is configured to engage Kelly Bar KB, wire or lowering device. When used in combination, the rotary encoder can be synced with the systems onboard the head unit. In this respect, both the surface systems, such as surface unit 40 and/or encoder 92, can include a timing device or clock 104 and head unit 30 can include a timing device or clock 106. Clocks 104 and 106 can be synchronized so that sensors 70 can take readings or be pinged against side wall(s) SW based on a unit of time. If the clocks are synchronized and head unit 30 is lowered during the lowering and raised during the raising phases at a known rate, the depths for each "ping" can be determined based on time. In addition, the accelerometers, pressure sensors and/or altimeters can further improve accuracies in depth measurement and/or lowering rate. The use of rotary encoder, accelerometers and/or altimeters in combination with wireless technology eliminates the need for wire and/lines connecting the device to surface systems and/or operator(s) monitoring the borehole inspection. Yet further, encoder 92 can include a wireless system 108 that allows communication between encoder 92 and head 30 and/or surface unit 40, 41.

Figure 9:
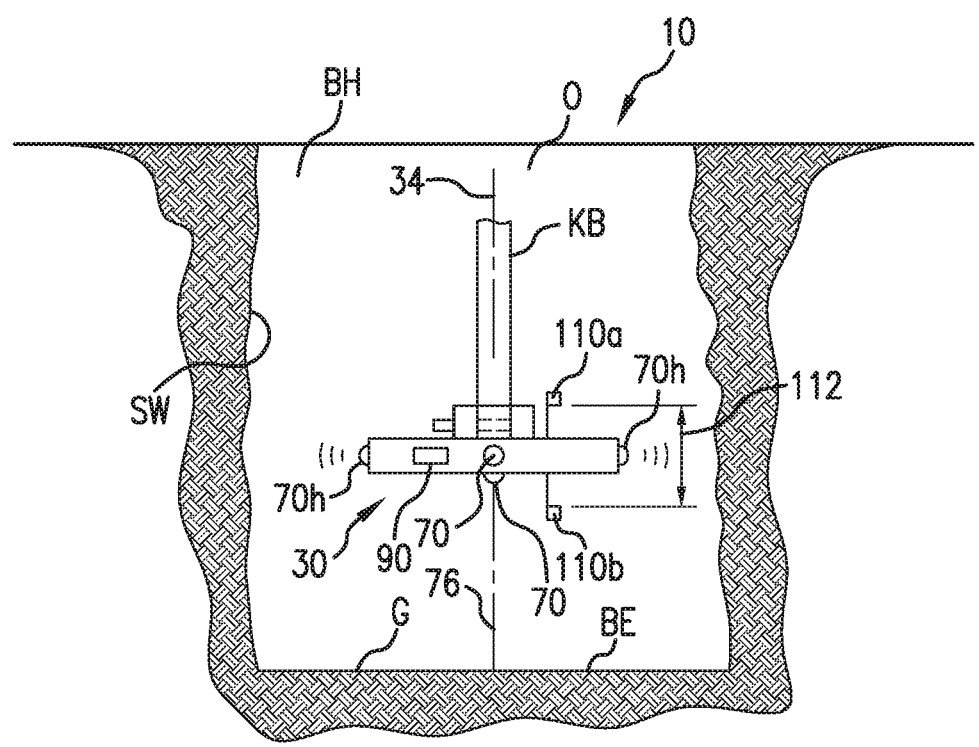
FIG. 9 is a side elevation view of another embodiment of the borehole inspection device of this application with dual pressure sensors; and, FIG. 10 is a schematic representation of a measurement system for a part of the system.

According to one set of embodiments, and with special reference to FIG. 9, head unit 30 can include one or more pressure sensors 110 to measure depth in the borehole alone or in combination with other systems described above. It is preferred that at least two pressure sensors be used to measure depth. More particularly, head unit 30 can include a first pressure sensor 110a and a second pressure sensor 110b. Moreover, pressure sensor 110a can be an upper sensor and pressure sensor 110b can be a lower sensor that are axially spaced relative to head axis 34 and which are separated by a known spacing 112. Known spacing 112 can be any known spacing. In one set of embodiments, spacing 112 can be approximately 12 inches. In one set of embodiments, spacing 112 is in the range of about 6 inches to 36 inches. In another set of embodiments, spacing 112 is between about 8 inches and 24 inches. In one embodiment, it is greater than 6 inches. In that spacing 112 is a known spacing, sensors 110 can confirm vertical movement by the changes in pressure. For example, movement of head by sensor spacing 112 should result in pressure sensor 110a reading the same pressure after the movement as sensor 110b read before the movement. This can be used to determine and/or confirm depth. Depth can be calculated in the same way wherein it can be determined that the head unit has moved by the distance of spacing 112 once sensor 110a reads the pressure of sensor 110b before the movement began. As a result, an analysis of the pressures of both sensors can be utilized to track depth and/or to confirm depth. As with other aspects of the system and/or arrangement, this data can be stored and/or communicated to other parts of the system in real time and/or during the data transmission phase.

Figure 4:
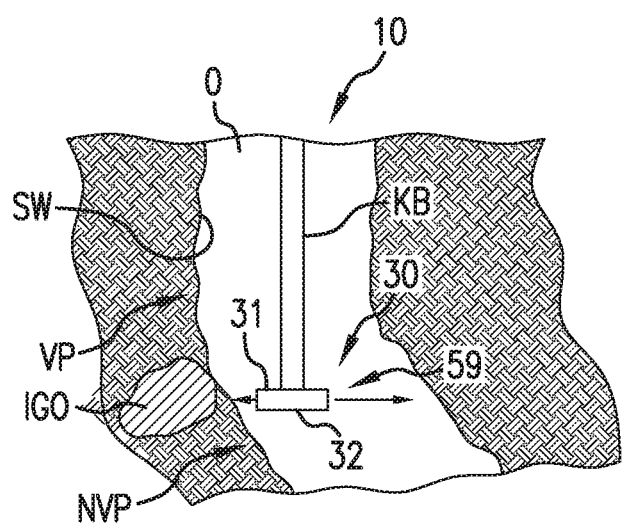
FIG. 4 is a side elevational view yet another borehole that includes a non-vertical section.

In addition, the one or more accelerometers 120 and/or gyroscopes 122 can be utilized to calculate the verticality of the hole being scanned. In greater detail, and with special reference to FIG. 4, when borehole O is bored, the boring tool can encounter an in ground obstacle IGO that can cause deflection of the bore wherein the bore opening can in include a vertical portion VP and a non-vertical portion NVP. The accelerometers and/or gyroscopes can confirm the verticality of head unit head 30 and/or sensor arrangement 59 to maintain and/or determine if head unit axis 34 is plumb to allow head unit to detect the verticality of the borehole opening. Further, the accelerometers and/or gyroscopes can be used with other components in system 10 to lower the head unit into the opening. This information can then be used in combination with sensor data from sensors 70 to allow both hole size determination and verticality determination of opening O to determine when it has transition from a vertical section to a non-vertical section and/or vice versa.

According to even yet further aspects of the present invention, the use of the rotary encoder, accelerometers and/or altimeters in combination with wireless technology improves the system's ability to work in a semi-automated and/or fully automated mode of inspection. Yet further, these modes of operation can allow multiple boreholes to be inspected simultaneously with a single surface unit device or system wherein at least one embodiment includes multiple head units that communicate with a single surface unit and/or off-site unit.

The systems and devices of this application can work together to allow inspection device 10 to be a quickly deployed borehole measuring system that can operate in a wide variety of borehole configurations and sizes without significant set up. Yet further, the systems of this application can work in combination with other sensing devices without detracting from the invention of this application. While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

It is claimed:

1. An inspection system to measure the condition of at least the wall of a ground opening, the inspection system comprising a head unit configured to be lowered into an associated borehole and having a lowering mount configured to be operably and selectively joined to an associated lowering device to facilitate the lowering of the head unit into the associated borehole during a data collection phase, the data collection phase including at least one of a lowering phase wherein the head unit is lowered in the associated borehole toward an associated bottom extent of the borehole by the associated lowering device and a raising phase wherein the head unit is raised in the associated borehole away from the associated bottom extent, at least two sets of test data being collected concerning one or more physical characteristics of the associated borehole during the data collection phase, the head unit comprising an internal measurement system and a first sensor arrangement, the first sensor arrangement including a plurality of side sensors facing radially outwardly of a head axis that is generally parallel to at least a portion of an associated borehole axis and collecting a first set of data relating to one or more conditions of an associated sidewall of the associated borehole, the plurality of side sensors of the first sensor arrangement allowing the head unit to be moved during the data collection phase and collect the first set of data during at least a portion of the data collection phase without rotation about the head axis, the plurality of side sensors at least partially producing the first set of data of the at least two sets of test data collected during the data collection phase, the inspection system further including a second sensor arrangement, the second sensor arrangement including at least one bottom sensor facing downwardly and generally parallel to the head axis wherein the second sensor arrangement collects a second set of data relating to one or more conditions of an associated bottom of the associated borehole, the at least one bottom sensor of the second sensor arrangement allowing the head unit to be moved during at least a portion of the data collection phase and collect the second set of data, the at least one bottom sensor at least partially producing the second set of data of the at least two sets of test data collected during the at least a portion of the data collection phase, the head unit includes a wireless operating system, the wireless operating system includes the head unit with the internal measurement system being a self-contained operating system having an internal power supply and a data store, the data store providing at least one of commands for the operation of the head unit during the data collection phase and data storage for the storage of the at least one set of test data during the data collection phase, wherein the system includes a depth system to measure a head unit depth of the sensor arrangement within the associated borehole, the depth system including a surface unit that includes a surface unit timer, the depth system further including a head unit timer within the self-contained operating system, the depth system further including a depth sensor configured to measure movement of the associated lowering device that facilitates the lowering of the head unit into the associated borehole during the data collection phase, the surface unit timer and the head unit timer being synchronizeable to allow for the correlation of the at least one set of test data collected during the data collection phase to a corresponding depth of the head unit.

2. The inspection system of claim 1 wherein the depth system further includes at least two pressure sensors, the at least two pressure sensors including a first pressure sensor and a second pressure sensor, the first pressure sensor being axially spaced above the second pressure sensor relative to the head axis by a pressure sensor spacing.

3. An inspection system to measure the condition of at least the wall of a ground opening, the inspection system comprising a head unit configured to be lowered into an associated borehole and having a lowering mount configured to be operably and selectively joined to an associated lowering device to facilitate the lowering of the head unit into the associated borehole during a data collection phase, the data collection phase including at least one of a lowering phase wherein the head unit is lowered in the associated borehole toward an associated bottom extent of the borehole by the associated lowering device and a raising phase wherein the head unit is raised in the associated borehole away from the associated bottom extent, at least two sets of test data being collected concerning one or more physical characteristics of the associated borehole during the data collection phase, the head unit comprising an internal measurement system and a first sensor arrangement, the first sensor arrangement including a plurality of side sensors facing radially outwardly of a head axis that is generally parallel to at least a portion of an associated borehole axis and collecting a first set of data relating to one or more conditions of an associated sidewall of the associated borehole, the plurality of side sensors of the first sensor arrangement allowing the head unit to be moved during the data collection phase and collect the first set of data during at least a portion of the data collection phase without rotation about the head axis, the plurality of side sensors at least partially producing the first set of data of the at least two sets of test data collected during the data collection phase, the inspection system further including a second sensor arrangement, the second sensor arrangement including at least one bottom sensor facing downwardly and generally parallel to the head axis wherein the second sensor arrangement collects a second set of data relating to one or more conditions of an associated bottom of the associated borehole, the at least one bottom sensor of the second sensor arrangement allowing the head unit to be moved during at least a portion of the data collection phase and collect the second set of data, the at least one bottom sensor at least partially producing the second set of data of the at least two sets of test data collected during the at least a portion of the data collection phase, wherein the system includes a depth system to measure a depth of the sensor arrangement within the associated borehole, the depth system including at least two pressure sensors, the at least two pressure sensors including a first pressure sensor and a second pressure sensor, the first pressure sensor being axially spaced above the second pressure sensor relative to the head axis by a pressure sensor spacing.

4. The inspection system of claim 3 wherein the depth system further includes at least one of an accelerometer, an altimeter, and a rotary encoder.

5. An inspection system to measure the condition of at least the wall of a ground opening, the inspection system comprising a head unit configured to be lowered into an associated borehole and having a lowering mount configured to be operably and selectively joined to an associated lowering device to facilitate the lowering of the head unit into the associated borehole during a data collection phase, the data collection phase including at least one of a lowering phase wherein the head unit is lowered in the associated borehole toward an associated bottom extent of the borehole by the associated lowering device and a raising phase wherein the head unit is raised in the associated borehole away from the associated bottom extent, at least two sets of test data being collected concerning one or more physical characteristics of the associated borehole during the data collection phase, the head unit comprising an internal measurement system and a first sensor arrangement, the first sensor arrangement including a plurality of side sensors facing radially outwardly of a head axis that is generally parallel to at least a portion of an associated borehole axis and collecting a first set of data relating to one or more conditions of an associated sidewall of the associated borehole, the plurality of side sensors of the first sensor arrangement allowing the head unit to be moved during the data collection phase and collect the first set of data during at least a portion of the data collection phase without rotation about the head axis, the plurality of side sensors at least partially producing the first set of data of the at least two sets of test data collected during the data collection phase, the inspection system further including a second sensor arrangement, the second sensor arrangement including at least one bottom sensor facing downwardly and generally parallel to the head axis wherein the second sensor arrangement collects a second set of data relating to one or more conditions of an associated bottom of the associated borehole, the at least one bottom sensor of the second sensor arrangement allowing the head unit to be moved during at least a portion of the data collection phase and collect the second set of data, the at least one bottom sensor at least partially producing the second set of data of the at least two sets of test data collected during the at least a portion of the data collection phase, wherein the head unit includes at least one calibration sensor arrangement configured to at least one of measure a sensor arrangement depth within the associated borehole, confirm the head depth, measure an associated borehole fluid density of an associated borehole fluid, and measure a sensor wave speed of the plurality of side sensors.

6. The inspection system of claim 5 wherein the at least one calibration sensor arrangement includes at least one of a density sensor to measure the associated borehole fluid density and a pressure sensor to measure the pressure of the associated borehole fluid.

7. The inspection system of claim 6 wherein the density sensor includes a transmitter and a receiver, the receiver being spaced from the transmitter by a known density sensor spacing.

* * * * *